United States Patent
Ou et al.

(10) Patent No.: US 8,270,756 B2
(45) Date of Patent: Sep. 18, 2012

(54) METHOD FOR ESTIMATING NOISE

(75) Inventors: Hsin-Ying Ou, Hsin Chu (TW); Po-Wei Chao, Hsin Tien (TW)

(73) Assignee: Realtek Semiconductor Corp., Hsinchu (TW)

( * ) Notice: Subject to any disclaimer, the term of this patent is extended or adjusted under 35 U.S.C. 154(b) by 1243 days.

(21) Appl. No.: 12/003,358

(22) Filed: Dec. 21, 2007

(65) Prior Publication Data

US 2008/0152256 A1  Jun. 26, 2008

(30) Foreign Application Priority Data

Dec. 26, 2006  (TW) ............................... 95148875 A

(51) Int. Cl.
*G06K 9/40* (2006.01)
*G06K 9/56* (2006.01)
*H04N 5/00* (2011.01)
*H04N 9/64* (2006.01)
*H04N 5/21* (2006.01)

(52) U.S. Cl. ........ 382/275; 382/260; 382/205; 382/308; 348/607; 348/701; 348/618; 348/627; 348/720

(58) Field of Classification Search .................. None
See application file for complete search history.

(56) References Cited

U.S. PATENT DOCUMENTS

| | | | | |
|---|---|---|---|---|
| 5,442,462 A * | 8/1995 | Guissin | ........................ | 358/463 |
| 5,799,111 A * | 8/1998 | Guissin | ........................ | 382/254 |
| 6,061,100 A * | 5/2000 | Ward et al. | .................... | 348/607 |
| 6,434,196 B1 * | 8/2002 | Sethuraman et al. | .... | 375/240.12 |
| 7,418,149 B2 * | 8/2008 | Dinh et al. | .................... | 382/254 |
| 2005/0141614 A1 * | 6/2005 | Braspenning et al. | ... | 375/240.16 |
| 2005/0226462 A1 * | 10/2005 | Wittebrood et al. | ......... | 382/103 |
| 2005/0271298 A1 * | 12/2005 | Yu | ................................. | 382/286 |
| 2006/0103765 A1 * | 5/2006 | Zhou et al. | .................... | 348/701 |
| 2006/0158513 A1 * | 7/2006 | Riemens et al. | ................ | 348/97 |
| 2006/0158562 A1 * | 7/2006 | Rhee | ............................. | 348/607 |
| 2007/0236609 A1 * | 10/2007 | Pathak et al. | ................. | 348/620 |
| 2010/0253855 A1 * | 10/2010 | Tener et al. | ................... | 348/699 |
| 2011/0037900 A1 * | 2/2011 | Rhee | ............................. | 348/607 |

FOREIGN PATENT DOCUMENTS

CN  1419680 A  5/2003

OTHER PUBLICATIONS de Haan et al., "Memory Integrated Noise Reduction IC for Television", *IEEE Transactions on Consumer Electronics*, vol. 42, No. 2, May 1996, pp. 175-181.

* cited by examiner

*Primary Examiner* — Randolph I Chu

(74) *Attorney, Agent, or Firm* — Muncy, Geissler, Olds & Lowe, PLLC

(57) ABSTRACT

An image noise detection method is disclosed. The image noise detection method includes the following steps: obtaining a spatial information of an image; obtaining a temporal information of the image; and determining a spatial noise or a temporal noise of the image according to both the spatial information, and the temporal information.

20 Claims, 4 Drawing Sheets

METHOD FOR ESTIMATING NOISE

BACKGROUND OF THE INVENTION

1. Field of the Invention

The present invention relates to a method for detecting image noise, and more particularly, to a method for detecting image noise according to spatial and temporal information of the image.

2. Description of the Related Art

In conventional applications, the detection of image noise is often divided into two categories. The first is to detect in the spatial domain and the second is to detect in the temporal domain. The image noise estimated in the spatial domain is often referred to as the spatial noise of the image because it is detected by using spatial information only. Similarly, the image noise estimated in the temporal domain is referred to as temporal noise of the image because it is detected by using temporal information only.

The above-mentioned spatial information represents information carried by a same frame. For example, the spatial information can be 1-D information (i.e., the information of the same scan line) or 2-D information (i.e., the information of multiple scan lines). On the other hand, the temporal information represents the information relating different frames.

However, disadvantages are accompanied with the above-mentioned two detecting categories. Take the spatial noise as an example, it is nearly impossible to differentiate the detected spatial noise originating from real noise or from a high-frequency portion of the original image. Since as mentioned previously, the spatial noise is detected by using spatial information only. Similarly, it is impossible to determine whether the detected temporal noise originated from real noise or from a moving object in the original image. Since the temporal noise is detected by using temporal information only. Therefore, the temporal noise or the spatial noise, may in fact not be noise and thereby making the detection incorrect.

The detection result of the spatial noise is quite essential for the image processing operation. Detecting incorrect results may further ruin (i.e., degrade) the image quality instead of improving it. In other words, the image may suffer from pronounced distortions due to the incorrect detection result.

SUMMARY OF THE INVENTION

In view of the above-mentioned problems, an object of the claimed invention is to provide a method of detecting image noise according to temporal information and spatial information, to solve the problems of the prior art as described above.

According to an embodiment of the claimed invention, a method for estimation of image noise is disclosed. The method includes: obtaining spatial information or an image by calculating a spatial noise estimation value to be utilized as the spatial information of the image; obtaining temporal information of the image; determining a spatial noise or a temporal noise of the image according to the spatial information and the temporal information residing in hardware by setting the spatial noise estimation value as the spatial noise of the image if the spatial noise estimation value is less than a predetermined threshold.

According to another embodiment of the claimed invention, an image noise detecting device is disclosed. The image noise detecting device includes: a spatial information detector, configured to obtain spatial information of an image; a temporal information detector, configured to obtain temporal information of the image; and a determining module, configured to determine a spatial noise or a temporal noise according to the spatial information and the temporal information.

The claimed invention detects the image noises utilizing both the temporal information and the spatial information. Therefore, the claimed invention prevents incorrectly determining the image noise. This allows the subsequent image processing operation to be performed with greater accuracy such that the image can be recovered (i.e., restored) more precisely and thereby the image's quality can be improved.

DETAILED DESCRIPTION OF THE INVENTION

Figure 1:
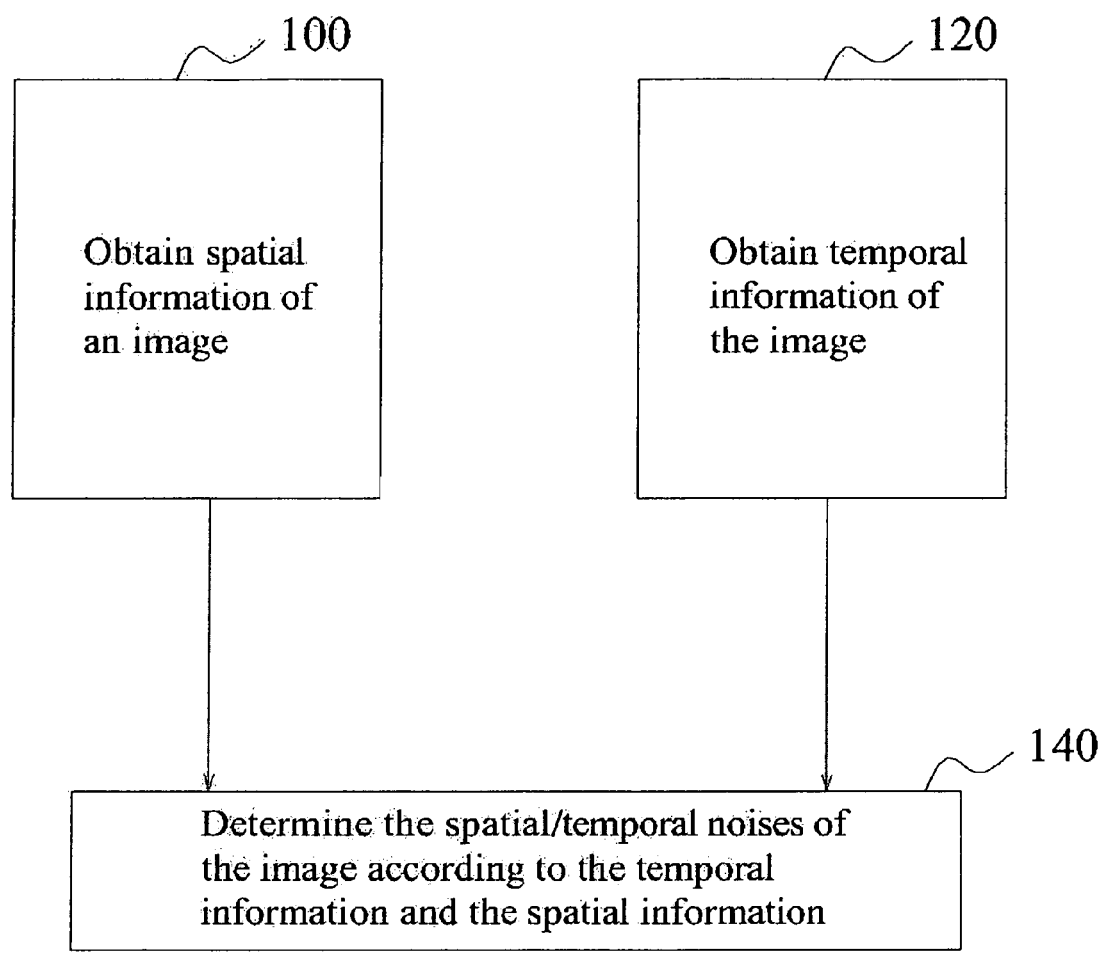
FIG. 1 is a flow chart illustrating a method for obtaining image noise according to the present invention.

Please refer to FIG. 1. FIG. 1 is a flow chart illustrating a method for detecting image noise according to an embodiment of the present invention. The method includes the following steps:

Step 100: Obtain spatial information of an image;
Step 120: Obtain temporal information of the image; and
Step 140: Determine the spatial noise and the temporal noise of the image according to the temporal information and the spatial information.

According to the above-mentioned steps, both the spatial information and the temporal information are used for determining the noise. In addition, detailed noise detecting mechanisms will be illustrated in the following disclosures.

Figure 2:
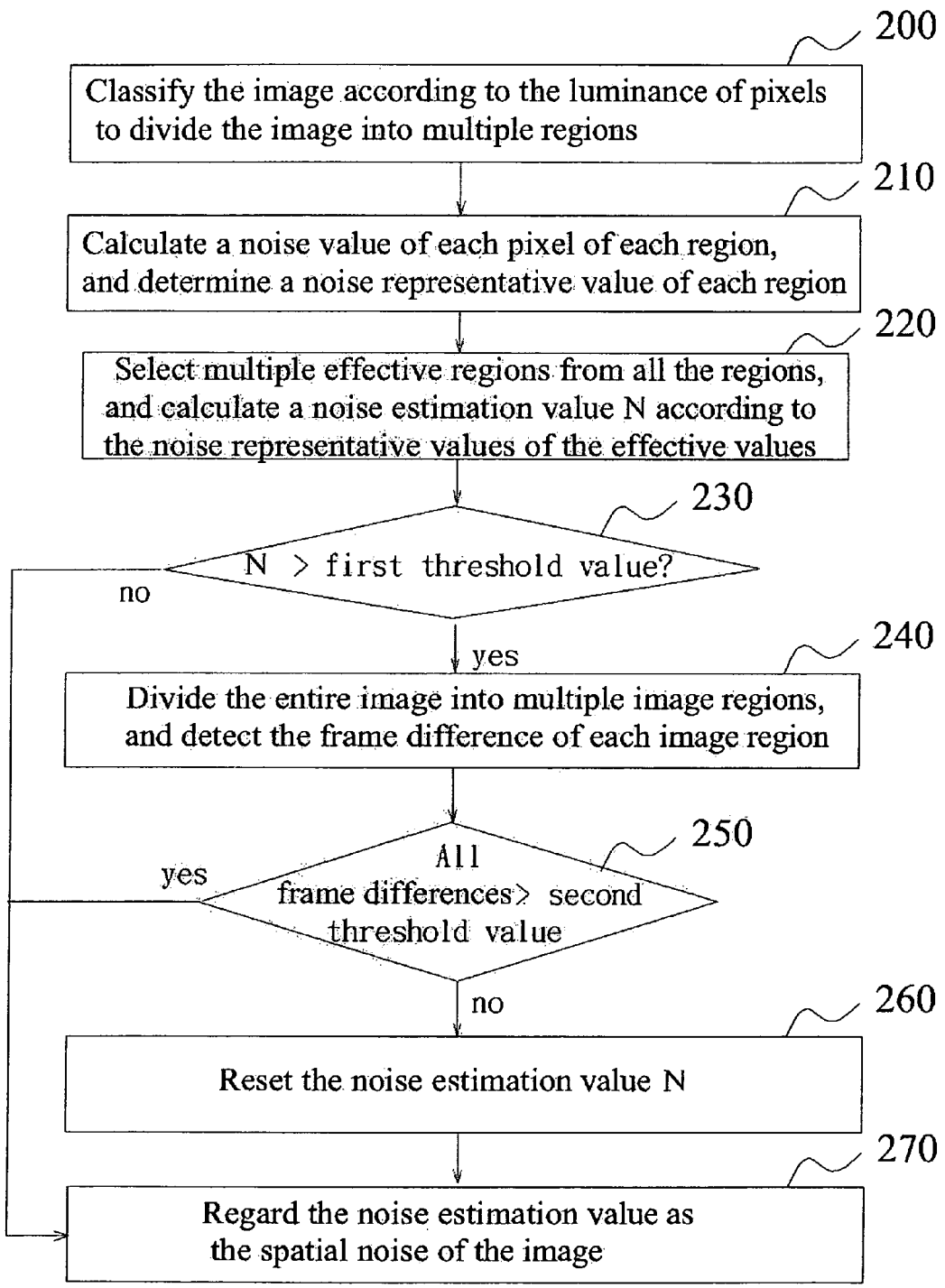
FIG. 2 is a flow chart illustrating a method for detecting spatial noise according to an embodiment of the present invention.

Please refer to FIG. 2. FIG. 2 is a flow chart of an embodiment of the present invention, illustrating a method for detecting the spatial noise. The method includes the following steps:

Step 200: Classify the image according to the luminance of pixels to divide the image into multiple regions;
Step 210: Calculate a noise value of each pixel of each region, and determine a noise representative value of each region;
Step 220: Select multiple effective regions from all the regions, and calculate a spatial noise estimation value N, according to the noise representative values of the effective values;
Step 230: Detect whether the spatial noise estimation value N is larger than a first threshold value. If the spatial noise estimation value N is larger than the first threshold value, then go to step 240; otherwise, go to step 270;
Step 240: Divide the entire image into multiple image regions, and detect the frame difference of each image region;
Step 250: Detect whether the frame differences of all the regions are larger than a second threshold value. If all the frame differences are larger than the second threshold value, then go to step 270; otherwise, go to step 260;
Step 260: Reset the spatial noise estimation value; go to step 270; and
Step 270: The spatial noise estimation value is regarded as the spatial noise of the image;

First, a reference pixel value of each pixel of an image (e.g.: a frame) is calculated. In this embodiment, an average pixel value of a current pixel and eight pixels surrounding the current pixel are used as the above-mentioned reference pixel value of the current pixel. Please note, the above-mentioned reference pixel value is primarily used for representing the current pixel, therefore, the present invention does not limit the calculation mechanism of the reference pixel value to the one disclosed herein. For example, the reference pixel value can be equal to the pixel value of the current pixel, or the reference pixel value can be calculated through other calculation methods. For example, the present invention can use the current pixel and the 4 pixels surrounding it. These changes are also within the spirit of the present invention.

After the reference pixel value of each pixel is obtained, the present invention classifies each pixel according to its reference pixel value. In an embodiment, all of the pixels can be classified into eight regions (i.e., classifications) such as: A1(Y=0-31), A2(Y=32-63), A3(Y=64-95), . . . , A8(Y=224-255). It can be seen that each region (i.e., classification) includes 16 pixel values. Please note that in this embodiment, the pixel values are luminance values (step 200).

Please note that in this embodiment, neither the number of the regions used in step 200 nor the number of luminance values contained in each region is limited. In other words, in step 200, the entire image can be classified into additional regions, for example, 16 regions, and each region may include 16 luminance values. This change also falls within the scope of the present invention.

Next, variances of each pixel of each region and the surrounding eight pixels of each pixel are calculated. The variance represents the error of the pixel. In this embodiment, for each of the regions, the smallest variance from the calculated variances of all of the pixels in the region is selected and the selected smallest variance is used as the error representation value of the region (step 210). For example, the region A1(Y=0-31) is presumed to include 10 pixels. As mentioned previously in this embodiment, variances of the 10 pixels will be calculated and the smallest variance from the calculated 10 variances is selected to be the error representation value of the region A1.

Similarly, the above-mentioned mechanism is only regarded as an embodiment, and is not considered a limitation of the present invention. In an actual implementation, other statistic data may be used as the error value of the pixel rather than the above-mentioned variances. Furthermore, other calculating methods for calculating the error representation value of the region may be used. For example, another statistic operation on all of the pixels of the region may be performed. These changes are also within the scope of the present invention.

Next, multiple representative regions from all of the regions is selected and a spatial noise estimation value N is calculated according to the selected representative regions (step 220). In this embodiment, because the number of the region cannot be predicted, some regions may have so little pixels that the regions cannot be used as references of the entire image (i.e., frame). Therefore, in this embodiment, the regions having a pixel number larger than 1/32 of all pixels are selected as the representative regions. In other words, if a region has pixels less than 1/32 of the pixels of the entire image, that region is ignored. However, the ratio 1/32 is only regarded as an example, and is not considered a limitation of the present invention. In an actual implementation, other pixel number thresholds (i.e., ratios) can also be used for determining the regions that qualify for selection.

An averaging operation can be performed on the error representative values of the selected regions to calculate the spatial noise estimation value N of the entire image (step 220). From the above steps, it can be seen that in steps 200 through 220, the spatial noise estimation value N is calculated according to the information of the image which is contained within a single frame. In other words, the steps 200 through 220 can correspond to the above-mentioned step 100, and the spatial noise estimation value N can be regarded as the spatial information obtained in step 100.

As mentioned previously, it is difficult to distinguish if the spatial noise estimation value N comes from real noise or from the high frequency portions of the image itself because only the spatial information is used for detecting the spatial noise estimation value N. For example, when a variance between the current pixel and the surrounding pixels is calculated, a large variance of the pixel located in the high frequency portion of the image will be detected, even if there is no noise error. The error estimation value N is thereby negatively influenced, which results in a large number. Therefore, in the following steps, temporal information is used for determining whether the spatial noise estimation value is reliable.

In this embodiment, a first threshold value is set for determining whether the spatial noise estimation value N is reliable. For example, the first threshold value can be set according to an experimental result. Next, the spatial noise estimation value N is compared with the first threshold value (step 230). If the spatial noise estimation value N is less then the first threshold, the detected spatial noise estimation value N is regarded as the spatial noise of the image (step 270). It is believed that spatial noise estimation value N reflects actual noise since the spatial noise estimation value N is less than a specific number, such as the above-mentioned threshold value. Therefore, the present invention regards the spatial noise estimation value N as the spatial noise. However, please note that the present invention does not limit the value of the first threshold value. One having ordinary skill in the art may set the threshold value according to the demands at hand. This change should also fall within the scope of the present invention.

On the other hand, if the spatial noise estimation value N is larger than the first threshold value (step 230), the estimation value N may be influenced by original characteristics (e.g.: high-frequency contents) of the image instead of actual noise.

In an embodiment, the entire image is divided into multiple image regions (e.g., 9 different image regions). The temporal differences of these image regions are then detected (step 240). The temporal differences should be higher than a predetermined value if the estimation value N came from actual noise. In other words, if the image has no frame difference, i.e. no difference between two successive frames, a large spatial noise estimation value N would be regarded as primarily resulting from the original characteristics of the image. In this way, the spatial noise estimation value N cannot be used as an input in the following image processing operation.

Therefore, in this embodiment, the frame differences of all of the image regions are compared with the second threshold value (step 250). Accordingly, if any one of the frame differences of the image regions is less than the second threshold value, the detected spatial noise estimation value N is regarded as an unreliable detection result such that the detected spatial noise estimation value N is reset to 0 (step 260). It can be seen that when the spatial noise result in the detected spatial noise estimation value N is being reset to 0, no further compensations are to be performed in the following image processing operations as indicated in step 270.

On the other hand, if all frame differences of all of the image regions are larger than the second threshold value, this means that the spatial noise estimation value N primarily comes from the actual noise. Therefore, the spatial noise estimation value N is used as the spatial noise of the image (step 270).

From the above disclosure, the spatial noise of the image is determined according to both the spatial information and the temporal information. Therefore, the possibility of incorrectly detecting the spatial noise is reduced. Furthermore, in this way, when the detected spatial noise is then used in the image processing operation (e.g., used as a parameter of a filter), the image distortion can be reduced and the image quality is increased.

Figure 3:
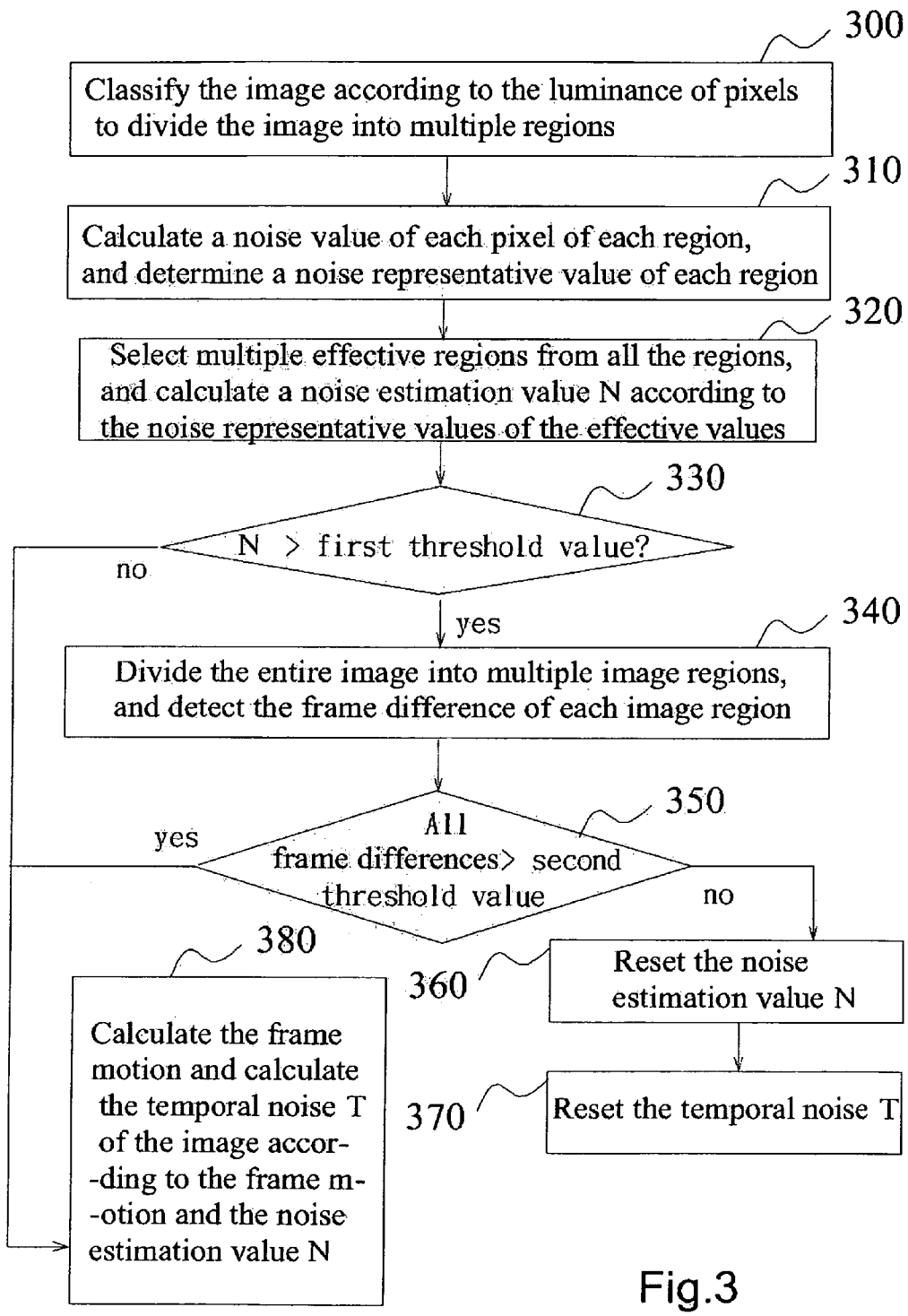
FIG. 3 is a detailed flow chart illustrating a method for detecting a temporal noise according to an embodiment of the present invention.

The detecting mechanism of the temporal noise will be illustrated in the following disclosure. Please refer to FIG. 3. FIG. 3 is a detailed flow chart illustrating a method for detecting temporal noise according to an embodiment of the present invention. The method includes the following steps:

Step 300: Classify the image according to the luminance of pixels to divide the image into multiple regions;
Step 310: Calculate a noise value of each pixel of each region, and determine a noise representative value of each region;
Step 320: Select multiple effective regions from all of the regions, and calculate a spatial noise estimation value N according to the noise representative values of the effective values;
Step 330: Detect whether the spatial noise estimation value N is larger than a first threshold value. If the spatial noise estimation value N is larger than the first threshold value, then go to step 340; otherwise, go to step 380;
Step 340: Divide the entire image into multiple image regions, and detect the frame difference of each image region;
Step 350: Detect whether the frame differences of all of the regions are larger than a second threshold value. If all the frame differences are larger than the second threshold value, then go to step 380; otherwise, go to step 360;
Step 360: Reset the spatial noise estimation value N; go to step 370;
Step 370: Reset temporal noise estimation value T to zero; and
Step 380: Calculate the frame motion and calculate the temporal noise estimation value T of the image according to the frame motion and the spatial noise estimation value N;

Please note that the steps 300 through 360 are similar to the above-mentioned steps 200 through 260, and therefore further details are omitted herein for the sake of brevity. In step 370, when the spatial noise estimation value N is reset (step 360), the temporal noise estimation value T is also reset.

The spatial noise estimation value N detected during steps 300 through 370 can be directly regarded as temporal noise, which can be used in the following image processing operation. Basically, the noise representative value N, which can roughly represent the temporal noise, is detected according to both the spatial information and the temporal information. Please note that if the spatial noise estimation value N is directly used in the following image processing operation without adjustment, the processed image may introduce a shadow on the image because the spatial noise estimation value N may be very large.

Therefore, the present invention further uses temporal information to adjust the spatial noise estimation value N to generate a better (i.e., more accurate) temporal noise estimation value T. In this embodiment, the present invention calculates a frame motion of the image and then generates a better temporal noise estimation value T according to the frame motion and the spatial noise estimation value N. For example, the present invention can classify the frame motion into 4 degrees, a scale of 1 through 4, where 1 indicates that the image is a still image and 4 indicates that the image is in its most vigorous motion. The relationship between the spatial noise estimation value N and the temporal noise estimation value T can be illustrated by the following equation (1).

$$T = N/\text{frame motion} \quad \text{Equation (1)}$$

From equation (1) we can see that the temporal noise estimation value T is adjusted according to the frame motion. Therefore, when the detected temporal noise is used in successive image processing operation (for example, when used as a parameter of a filter), the image distortion caused by the temporal noise can be reduced such that the shadow effect will not occur and the image quality is thereby improved.

Similarly, the above-mentioned equation (1) is also regarded as an embodiment, not a limitation of the present invention. The temporal noise estimation value T can be adjusted according to temporal information through other methods not explicitly disclosed herein.

Furthermore, the acquirement of the temporal noise estimation value T of the image in its entirety for performing successive image processing operation is not a requirement. This mechanism is also an embodiment that should not be a limitation of the present invention. In actual implementations, the temporal noise estimation value T of only a specific portion of the entire image may be obtained, and then be used for performing the image processing operation on that specific portion of the image.

For example, in step 340, the image is divided into multiple image regions. Therefore, a temporal noise for each image region is determined respectively, and then used for performing the image processing on the corresponding image regions. This allows successive image processing operation to bring out improved performance.

Please note that in the above mechanism, if the temporal noise estimation value T of any one of the multiple image regions is reset to 0 (i.e., resetting to 0 means that one or more of the image region does not have any frame difference), the temporal noises of all the image regions should all be simultaneously reset to 0 in order to prevent an incorrect temporal noise determination.

In addition, please note that the steps 200 through 220 and steps 300 through 320 are only embodiments for calculating the spatial noise estimation value N, and should not be a limitation of the present invention. One having ordinary skill in the art can use other arithmetic methods to estimate the spatial noise estimation value N. Other arithmetic methods that are not explicitly disclosed herein should also fall within the scope of the present invention.

For example, in the above disclosure, the spatial noise estimation value N is estimated first, and then is determined to be reliable or not according to the temporal information (e.g., the frame differences of all image regions can be used). As mentioned previously, this is because the spatial noise estimation value N may be the result of the high-frequency contents of the image.

Therefore, the smooth area of the image is detected first, and then a statistics operation on the smooth area is performed (i.e., such as the steps 300 through 320) to generate a spatial noise estimation value N. In other words, before the statistics operation is performed, high frequency portions of the image may be removed. Please note that smooth areas are apparently not high-frequency portions. Therefore, after the spatial noise estimation value N is generated, the reliability of the spatial noise estimation value N is no longer concerned.

Figure 4:
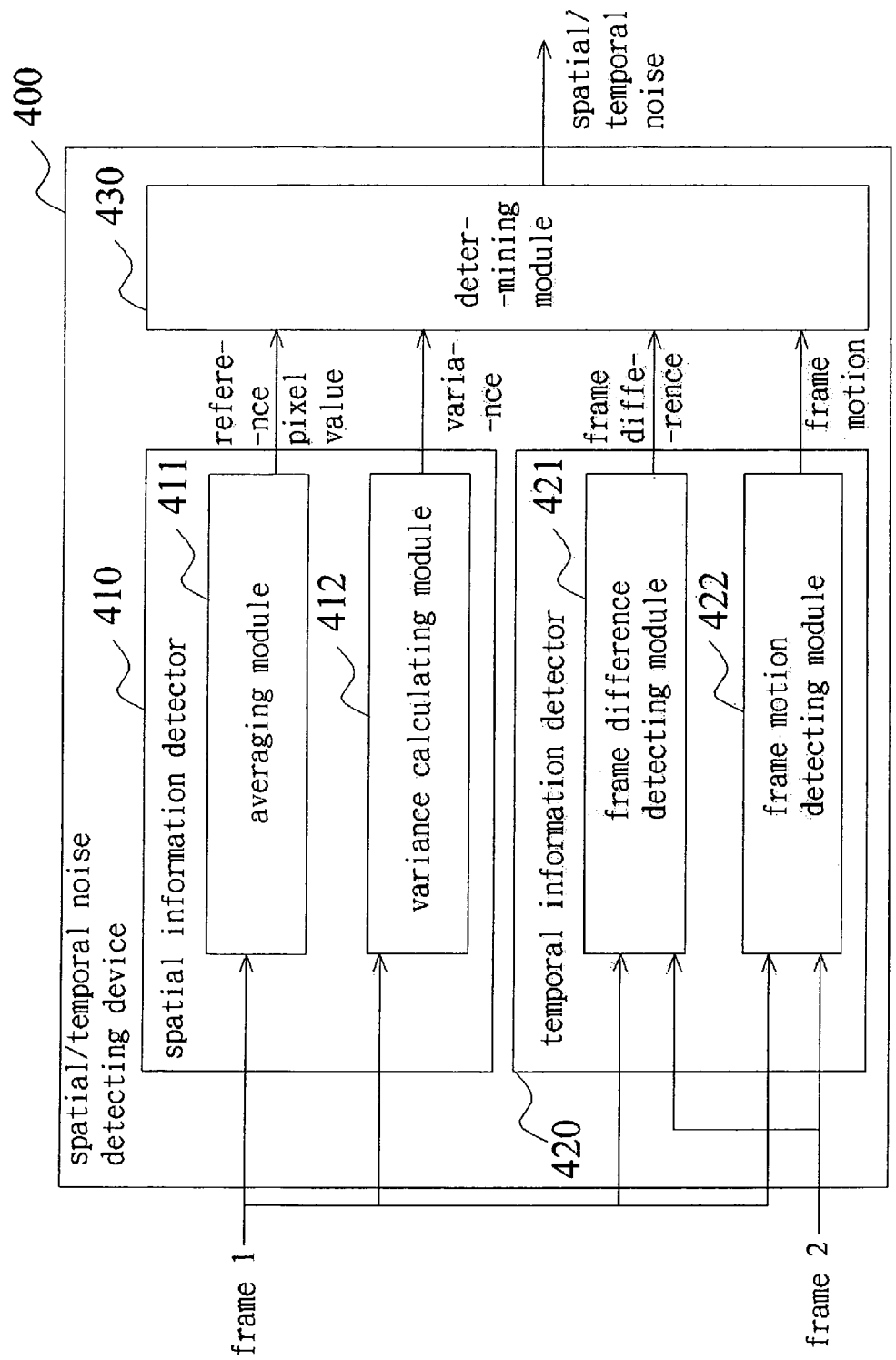
FIG. 4 is a block diagram of a spatial/temporal noise detection device according to an embodiment of the present invention.

Please refer to FIG. 4. FIG. 4 is a block diagram of a spatial/temporal noise detection device illustrated according to an embodiment of the present invention. As shown in FIG. 4, the spatial/temporal noise detecting device 400 includes a spatial information detector 410, a temporal information detector 420, and a determining module 430. The detecting module 430 is coupled to the temporal information detector 420 and the spatial information detector 410.

The spatial information detector 410 is used for generating spatial information of an image. As shown in FIG. 4, the spatial information is 1-D and/or 2-D information of frame 1. The spatial information detector 410 includes the averaging module 411 and variance calculating module 412, for calculating the above-mentioned reference pixel values and the variances, respectively.

The temporal information detector 420 is used for generating temporal information of an image. As shown in FIG. 4, the temporal information is derived from the difference between frame 1 and frame 2. The temporal information detector 420 includes the frame difference detecting module 421 and frame motion detecting module 422, for calculating the above-mentioned frame differences and the frame motions, respectively.

The determining module 430 generates the spatial/temporal noise according to the spatial information and temporal information provided by the spatial information detector 410 and temporal information detector 420. In other words, the determining module 430 performs the above-mentioned image region dividing operation, reliability analysis, temporal noise adjustment, and so on, for generating appropriate temporal noise and spatial noise.

Please note, the components are shown as functional blocks in FIG. 4. This means that the present invention does not limit the implementations of the components. In the actual implementation, the above-mentioned components can be embodied as pure hardware or hardware executing software. Furthermore, since the operations and functions of each component are illustrated in the above disclosure, further details are omitted hereinafter.

Moreover, as mentioned previously, the present invention can first detect the smooth areas, and then perform the statistics operation on the smooth areas for generating the spatial noise estimation value N. Therefore, the inner components of the spatial information detector 410 can be replaced by a smooth area detector and a statistic operation module.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A method for estimating image noises implemented by software residing in hardware, the method comprising:
   obtaining spatial information of an image by calculating a spatial noise estimation value to be utilized as the spatial information of the image;
   obtaining temporal information of the image; and
   determining a spatial noise or a temporal noise of the image according to the spatial information and the temporal information residing in hardware by setting the spatial noise estimation value as the spatial noise of the image if the spatial noise estimation value is less than a predetermined threshold.

2. A method for estimating image noises implemented by software residing in hardware, the method comprising:
   obtaining spatial information of an image by calculating a spatial noise estimation value to be utilized as the spatial information of the image;
   obtaining temporal information of the image by dividing the image into K regions if the spatial noise estimation value is larger than a predetermined value, wherein K is an integer; calculating a temporal difference of at least one region of the K regions, wherein the temporal difference of at least one region of the K regions is at least one portion of the temporal information of the image; and
   determining a spatial noise or a temporal noise of the image according to the spatial information and the temporal information residing in hardware.

3. The method of claim 2, wherein the step of determining the spatial noise or the temporal noise of the image according to the spatial information and the temporal information comprises:
   resetting the spatial noise of the image if the spatial noise estimation value is larger than a first predetermined threshold and the temporal difference of at least one region of the K regions is less than a second predetermined threshold.

4. The method of claim 2, wherein the step of determining the spatial noise or the temporal noise of the image according to the spatial information and the temporal information comprises:
   setting temporal noise estimation value as the temporal noise of the image if the spatial noise estimation value is larger than a first predetermined threshold and the temporal difference of all the K regions is not less than a second predetermined threshold.

5. A method for estimating image noises implemented by software residing in hardware, the method comprising:
   obtaining spatial information of an image by calculating a spatial noise estimation value to be utilized as the spatial information of the image;
   calculating a reference pixel value of each pixel of the image and dividing the image into M regions according to the reference pixel value of each pixel of the image, wherein M is an integer;
   calculating reference noise values corresponding to a plurality of pixels in the M regions and obtaining a noise representation value of each of the M regions according to the reference noise values of the plurality of pixels in the M regions;
   selecting L regions from the M regions according to a number of pixels of each of the M regions, wherein L is an integer;
   calculating the spatial noise estimation value according to the noise representation value of each of the L regions;
   obtaining temporal information of the image; and
   determining a spatial noise or a temporal noise of the image according to the spatial information and the temporal information residing in hardware.

6. The method of claim 5, wherein the reference pixel value is a luminance value.

7. The method of claim 6, wherein the reference pixel value is an average luminance pixel of a current pixel and surrounding pixels of the current pixel.

8. The method of claim 5, wherein the step of calculating reference noise values of the plurality of pixels in the M regions comprises:
   calculating a variance between each of the pixels in the plurality of regions and surrounding pixels of each of the pixels.

9. The method of claim 8, wherein the step of obtaining the noise representation value of each of the M regions according to the reference noise values of the plurality of pixels in the M regions comprises:
selecting a smallest reference noise value from the reference noise values of the plurality of pixels in a region of the M regions and taking the smallest reference noise value as the representation noise value of the region.

10. The method of claim 5, wherein the step of selecting the L regions from the M regions according to the number of pixels of each of the M regions comprises:
selecting a region as a member of the L regions if the number of pixels in the region of the M regions is greater than a predetermined threshold.

11. The method of claim 5, wherein the step of calculating the spatial noise estimation value according to the noise representation value of each of the L regions comprises:
performing an averaging operation on a plurality of representation noise values of the L regions to obtain the spatial noise estimation value.

12. A method for estimating image noises implemented by software residing in hardware, the method comprising:
obtaining spatial information of an image by removing high frequency portions of the image and performing a statistics calculation on the image after removing the high frequency portions of the image;
calculating a spatial noise estimation value to be utilized as the spatial information of the image;
obtaining temporal information of the image; and
determining a spatial noise or a temporal noise of the image according to the spatial information and the temporal information residing in hardware.

13. The method of claim 12, wherein the step of determining the spatial noise or the temporal noise of the image according to the spatial information and the temporal information comprises:
setting the spatial noise estimation value as the spatial noise of the image.

14. The method of claim 3, wherein the step of obtaining the temporal information further comprises:
calculating a frame motion of the image;
wherein the frame motion is a portion of the temporal information.

15. The method of claim 14, wherein the step of determining the spatial noise or the temporal noise of the image according to the spatial information and the temporal information comprises:
adjusting the spatial noise estimation value according to the frame motion and utilizing the spatial noise estimation value as the temporal noise if the spatial noise estimation value is less than a third predetermined threshold value.

16. The method of claim 15, wherein the step of adjusting the spatial noise estimation value according to the frame motion comprises:
if the frame motion is less than a fourth predetermined threshold value, directly utilizing the spatial estimation value as the spatial noise.

17. The method of claim 15, wherein the step of adjusting the spatial noise estimation value according to the frame motion comprises:
reducing the spatial estimation value if the frame motion is not less than a fourth predetermined threshold value.

18. The method of claim 1, wherein the temporal noise is utilized in a filter to perform an image processing operation to eliminate the temporal noise.

19. An image noise detecting device, comprising:
a spatial information circuit, configured to obtain spatial information of an image by calculating a luminance value and a variance of each pixel in the image;
a temporal information circuit, configuring to obtain temporal information of the image; and
a determining circuit, coupled to the spatial information circuit and the temporal information circuit, configured to determine a spatial noise or a temporal noise according to the spatial and the temporal information,
wherein the image is divided into M regions according to the luminance value and L regions are selected among the M regions according to the variance to determine the spatial noise, wherein L and M are integers.

20. The image noise detecting device of claim 19, wherein the temporal information circuit is configured to calculate a frame difference and a frame motion.

* * * * *